United States Patent
Kong et al.

(10) Patent No.: US 12,498,312 B2
(45) Date of Patent: Dec. 16, 2025

(54) SAMPLE ANALYSIS APPARATUS AND SAMPLE ANALYSIS METHOD

(71) Applicant: Shenzhen Mindray Animal Medical Technology Co., Ltd., Guangdong (CN)

(72) Inventors: Fangang Kong, Shenzhen (CN); Tao Shi, Shenzhen (CN); Zhuxiang Yang, Shenzhen (CN); Xinjun Zhang, Shenzhen (CN); Shengxi Wang, Shenzhen (CN)

(73) Assignee: Shenzhen Mindray Animal Medical Technology Co., Ltd., Shenzhen (CN)

( * ) Notice: Subject to any disclaimer, the term of this patent is extended or adjusted under 35 U.S.C. 154(b) by 295 days.

(21) Appl. No.: 18/091,237

(22) Filed: Dec. 29, 2022

(65) Prior Publication Data

US 2023/0194411 A1 Jun. 22, 2023

Related U.S. Application Data

(63) Continuation of application No. PCT/CN2021/140470, filed on Dec. 22, 2021.

(51) Int. Cl.
| | |
|---|---|
| *G06K 9/00* | (2022.01) |
| *G01N 21/01* | (2006.01) |
| *G01N 21/64* | (2006.01) |
| *G01N 33/50* | (2006.01) |
| *G01N 15/01* | (2024.01) |

(Continued)

(52) U.S. Cl.
CPC ............. *G01N 21/01* (2013.01); *G01N 21/64* (2013.01); *G01N 33/5094* (2013.01); *G01N 2015/012* (2024.01); *G01N 2015/016* (2024.01); *G01N 2015/1024* (2024.01); *G01N 2021/0143* (2013.01); *G01N 2021/7786* (2013.01)

(58) Field of Classification Search
CPC ....... G01N 2015/012; G01N 2015/016; G01N 2015/1024; G01N 2021/0143; G01N 2021/7786; G01N 21/01; G01N 21/64; G01N 33/5094
See application file for complete search history.

(56) References Cited

U.S. PATENT DOCUMENTS

| | | | | |
|---|---|---|---|---|
| 5,378,633 | A | * | 1/1995 | von Behrens ...... G01N 15/1434 436/63 |
| 5,452,237 | A | * | 9/1995 | Jones, Jr. ............. G01N 15/132 702/182 |
| 2010/0270232 | A1 | * | 10/2010 | Iwanaga ............... B01J 20/3248 210/500.1 |

FOREIGN PATENT DOCUMENTS

| | | |
|---|---|---|
| CN | 101097180 A | 1/2008 |
| CN | 104805004 A | 7/2015 |
| CN | 105986003 A | 10/2016 |

(Continued)

*Primary Examiner* — Avinash Yentrapati
(74) *Attorney, Agent, or Firm* — Leydig, Voit & Mayer, Ltd.

(57) ABSTRACT

Disclosed are a sample analysis apparatus and method which include: obtaining a first light signal by irradiating a first test sample from blood and a first-channel reagent to differentiate neutrophils, eosinophils, lymphocytes, and monocytes; obtaining a second light signal from a second test sample from the blood and a second-channel reagent; counting the nucleated red blood cells and lymphocytes based on the second light signal; determining accuracy of the lymphocyte result from the first test sample; and if inaccurate, correcting the lymphocyte result based on the lymphocyte result of the second test sample.

20 Claims, 5 Drawing Sheets

(51) Int. Cl.
    *G01N 15/10*     (2006.01)
    *G01N 21/77*     (2006.01)

(56) References Cited

FOREIGN PATENT DOCUMENTS

| CN | 109580550 A | 4/2019 |
| CN | 112789503 A | 5/2021 |

\* cited by examiner

```
┌─────────────────────────────────┐
│ Generate a third scattergram based on │
│ side-scattered light and fluorescence │
│      of a second channel         │
└─────────────────────────────────┘
                 │  ⟍ 210
                 ▼
┌─────────────────────────────────┐
│ Calculate a lymphocyte result of the │
│ second channel based on the third │
│           scattergram            │
└─────────────────────────────────┘
                    ⟍ 212
```

*FIG. 12*

```
┌─────────────────────────────────┐
│ Generate a fourth scattergram based │
│   on forward-scattered light and │
│   fluorescence of a second channel │
└─────────────────────────────────┘
                 │  ⟍ 220
                 ▼
┌─────────────────────────────────┐
│ Calculate a lymphocyte result of the │
│ second channel based on the fourth │
│           scattergram            │
└─────────────────────────────────┘
                    ⟍ 222
```

SAMPLE ANALYSIS APPARATUS AND SAMPLE ANALYSIS METHOD

CROSS-REFERENCE TO RELATED APPLICATIONS

This application is a continuation of International Application No. PCT/CN2021/140470, filed on Dec. 22, 2021, which is incorporated herein by reference in its entirety.

TECHNICAL FIELD

The disclosure relates to a sample analysis apparatus and a sample analysis method.

BACKGROUND

A routine blood test is one of the most basic clinical laboratory tests, through which blood conditions and diseases are determined by observing changes in the number and morphological distribution of blood cells. In some examples, routine blood test items may include red blood cells, white blood cells, hemoglobin, and platelets.

When bacteria invade an organism such as a human or an animal, white blood cells can gather at the site where the bacteria invade and engulf the bacteria. If the number of white blood cells in the blood exceeds a normal value, it indicates that the organism may be suffering from inflammation. Mature normal white blood cells may be classified into five types: neutrophils (Neu), eosinophils (Eos), basophils (Baso), lymphocytes (Lym), and monocytes (Mon). The content of different cells in the blood has different clinical significance. Therefore, an accurate white blood cell differential is particularly important in clinical practice.

SUMMARY

In view of the problem of white blood cell differentiation, the disclosure mainly provides a sample analysis apparatus and a sample analysis method, which are described below in detail.

According to a first aspect, an embodiment provides a sample analysis apparatus, including:
- a blood sample supply portion configured to supply a blood sample;
- a reagent supply portion configured to supply a first-channel reagent and a second-channel reagent;
- a first channel configured to receive the blood sample provided by the blood sample supply portion and the first-channel reagent provided by the reagent supply portion, so as to prepare a first test sample, and obtain a light signal generated after the first test sample is irradiated with light;
- a second channel configured to receive the blood sample provided by the blood sample supply portion and the second-channel reagent provided by the reagent supply portion, so as to prepare a second test sample, and obtain a light signal generated after the second test sample is irradiated with light; and
- a processor capable of performing a white blood cell four-part differential based on the light signal of the first channel, the white blood cell four-part differential including a neutrophil result, an eosinophil result, a lymphocyte result, and a monocyte result, where the processor is capable of obtaining at least a nucleated red blood cell result based on the light signal of the second channel, wherein
the processor is further capable of obtaining a lymphocyte result based on the light signal of the second channel, to correct the lymphocyte result of the first channel.

In an embodiment, the processor determines whether the lymphocyte result of the first channel is accurate, based on the light signal of the first channel or a deviation between the lymphocyte result of the first test sample and the lymphocyte result of the second test sample; and when it is determined that the lymphocyte result is inaccurate, the processor corrects the lymphocyte result of the first channel based on the lymphocyte result of the second channel.

In an embodiment, the processor correcting the lymphocyte result of the first channel based on the lymphocyte result of the second channel includes:
- using, by the processor, the lymphocyte result of the second channel as a lymphocyte result to be output by the sample analysis apparatus.

In an embodiment, the processor correcting the lymphocyte result of the first channel based on the lymphocyte result of the second channel includes:
- calculating, by the processor, a weighted sum of the lymphocyte result of the first channel and the lymphocyte result of the second channel as a lymphocyte result to be output by the sample analysis apparatus.

In an embodiment, the processor determining whether the lymphocyte result of the first channel is accurate, based on the light signal of the first channel includes:
- the light signal of the first channel including at least side-scattered light and fluorescence;
- generating, by the processor, a first scattergram based on the side-scattered light and the fluorescence of the first channel; and
- determining, by the processor, whether there are clear boundaries between a lymphocyte population and a neutrophil population, based on the first scattergram, and if there are no clear boundaries, determining that the lymphocyte result of the first channel is inaccurate.

In an embodiment, the processor being further capable of obtaining a lymphocyte result based on the light signal of the second channel includes:
- the light signal of the second channel including at least forward-scattered light and side-scattered light;
- generating, by the processor, a second scattergram based on the forward-scattered light and the side-scattered light of the second channel; and
- calculating, by the processor, the lymphocyte result of the second channel based on the second scattergram.

In an embodiment, the processor being further capable of obtaining a lymphocyte result based on the light signal of the second channel includes:
- the light signal of the second channel including at least side-scattered light and fluorescence;
- generating, by the processor, a third scattergram based on the side-scattered light and the fluorescence of the second channel; and
- calculating, by the processor, the lymphocyte result of the second channel based on the third scattergram.

In an embodiment, the processor being further capable of obtaining a lymphocyte result based on the light signal of the second channel includes:
- the light signal of the second channel including at least forward-scattered light and fluorescence;
- generating, by the processor, a fourth scattergram based on the forward-scattered light and the fluorescence of the second channel; and calculating, by the processor, the lymphocyte result of the second channel based on the fourth scattergram.

In an embodiment, the processor being further capable of obtaining a lymphocyte result based on the light signal of the second channel includes:
the light signal of the second channel including forward-scattered light, side-scattered light, and fluorescence;
generating, by the processor, a second scattergram based on the forward-scattered light and the side-scattered light of the second channel; and calculating, by the processor, a first lymphocyte result of the second channel based on the second scattergram;
generating, by the processor, a third scattergram based on the side-scattered light and the fluorescence of the second channel; and calculating, by the processor, a second lymphocyte result of the second channel based on the third scattergram; and
calculating, by the processor, the lymphocyte result of the second channel based on the first lymphocyte result and the second lymphocyte result of the second channel.

In an embodiment, the processor being further capable of obtaining a lymphocyte result based on the light signal of the second channel includes:
the light signal of the second channel including forward-scattered light, side-scattered light, and fluorescence;
generating, by the processor, a second scattergram based on the forward-scattered light and the side-scattered light of the second channel; and calculating, by the processor, a first lymphocyte result of the second channel based on the second scattergram;
generating, by the processor, a fourth scattergram based on the forward-scattered light and the fluorescence of the second channel; and calculating, by the processor, a third lymphocyte result of the second channel based on the fourth scattergram; and
calculating, by the processor, the lymphocyte result of the second channel based on the first lymphocyte result and the third lymphocyte result of the second channel.

In an embodiment, the processor being further capable of obtaining a lymphocyte result based on the light signal of the second channel includes:
the light signal of the second channel including forward-scattered light, side-scattered light, and fluorescence;
generating, by the processor, a third scattergram based on the side-scattered light and the fluorescence of the second channel; and calculating, by the processor, a second lymphocyte result of the second channel based on the third scattergram; and
generating, by the processor, a fourth scattergram based on the forward-scattered light and the fluorescence of the second channel; and calculating, by the processor, a third lymphocyte result of the second channel based on the fourth scattergram; and
calculating, by the processor, the lymphocyte result of the second channel based on the second lymphocyte result and the third lymphocyte result of the second channel.

In an embodiment, the processor is further capable of obtaining a white blood cell count result and/or a basophil result based on the light signal of the second channel.

In an embodiment, the basophil result includes a percentage of basophils in white blood cells.

In an embodiment, the processor is further capable of calculating a neutrophil result based on the eosinophil result and the monocyte result of the first channel, the basophil result of the second channel, and a corrected lymphocyte result, and using the neutrophil result as a neutrophil result to be output by the sample analysis apparatus.

In an embodiment, the neutrophil result includes a percentage of neutrophils in white blood cells, the eosinophil result includes a percentage of eosinophils in the white blood cells, the lymphocyte result includes a percentage of lymphocytes in the white blood cells, and the monocyte result includes a percentage of monocytes in the white blood cells.

In an embodiment, the first channel is a DIFF channel; and the second channel is a WNB channel.

In an embodiment, the light signal of the first channel includes forward-scattered light, side-scattered light, and fluorescence; and the light signal of the second channel includes forward-scattered light, side-scattered light, and fluorescence.

According to a second aspect, an embodiment provides a sample analysis method, including:
preparing a first test sample from a blood sample and a first-channel reagent;
obtaining a light signal generated after the first test sample is irradiated with light;
performing a white blood cell four-part differential based on the light signal of the first test sample, the white blood cell four-part differential including a neutrophil result, an eosinophil result, a lymphocyte result, and a monocyte result;
determining whether the lymphocyte result of the first test sample is accurate; and
when it is determined that the lymphocyte result is inaccurate, correcting the lymphocyte result of the first test sample based on a lymphocyte result of a second test sample, wherein the second test sample is prepared from the blood sample and a second-channel reagent, and a light signal generated after the second test sample is irradiated with light is usable to calculate a nucleated red blood cell result and a lymphocyte result.

In an embodiment, correcting the lymphocyte result of the first test sample based on a lymphocyte result of a second test sample includes any one of the following:
using a lymphocyte result of the second channel as a lymphocyte result to be output; or
calculating a weighted sum of the lymphocyte result of the first channel and the lymphocyte result of the second channel as the lymphocyte result to be output.

In an embodiment, calculating a lymphocyte result based on the light signal generated after the second test sample is irradiated with light includes:
the light signal of the second channel including at least forward-scattered light and side-scattered light;
generating a second scattergram based on the forward-scattered light and the side-scattered light of the second channel; and
calculating the lymphocyte result of the second channel based on the second scattergram.

In an embodiment, calculating a lymphocyte result based on the light signal generated after the second test sample is irradiated with light includes:
the light signal of the second channel including at least side-scattered light and fluorescence;
generating a third scattergram based on the side-scattered light and the fluorescence of the second channel; and
calculating the lymphocyte result of the second channel based on the third scattergram.

In an embodiment, calculating a lymphocyte result based on the light signal generated after the second test sample is irradiated with light includes:
the light signal of the second channel including at least forward-scattered light and fluorescence;

generating a fourth scattergram based on the forward-scattered light and the fluorescence of the second channel; and calculating the lymphocyte result of the second channel based on the fourth scattergram.

In an embodiment, calculating a lymphocyte result based on the light signal generated after the second test sample is irradiated with light includes:

the light signal of the second channel including forward-scattered light, side-scattered light, and fluorescence;

generating a second scattergram based on the forward-scattered light and the side-scattered light of the second channel; and calculating a first lymphocyte result of the second channel based on the second scattergram;

generating a third scattergram based on the side-scattered light and the fluorescence of the second channel; and calculating, by the processor, a second lymphocyte result of the second channel based on the third scattergram; and calculating the lymphocyte result of the second channel based on the first lymphocyte result and the second lymphocyte result of the second channel.

In an embodiment, calculating a lymphocyte result based on the light signal generated after the second test sample is irradiated with light includes:

the light signal of the second channel including forward-scattered light, side-scattered light, and fluorescence;

generating a second scattergram based on the forward-scattered light and the side-scattered light of the second channel; and calculating a first lymphocyte result of the second channel based on the second scattergram;

generating a fourth scattergram based on the forward-scattered light and the fluorescence of the second channel; and calculating, by the processor, a third lymphocyte result of the second channel based on the fourth scattergram; and calculating the lymphocyte result of the second channel based on the first lymphocyte result and the third lymphocyte result of the second channel.

In an embodiment, calculating a lymphocyte result based on the light signal generated after the second test sample is irradiated with light includes:

the light signal of the second channel including forward-scattered light, side-scattered light, and fluorescence;

generating a third scattergram based on the side-scattered light and the fluorescence of the second channel; and calculating a second lymphocyte result of the second channel based on the third scattergram;

generating a fourth scattergram based on the forward-scattered light and the fluorescence of the second channel; and calculating, by the processor, a third lymphocyte result of the second channel based on the fourth scattergram; and calculating the lymphocyte result of the second channel based on the second lymphocyte result and the third lymphocyte result of the second channel.

In an embodiment, the light signal generated after the second test sample is irradiated with light is further usable to obtain a white blood cell count result and/or a basophil result.

In an embodiment, the basophil result includes a percentage of basophils in white blood cells.

In an embodiment, the sample analysis method further includes: calculating a neutrophil result based on the eosinophil result and the monocyte result of the first channel, the basophil result of the second channel, and a corrected lymphocyte result, and using the neutrophil result as a neutrophil result to be output.

In an embodiment, the first channel is a DIFF channel; and the second channel is a WNB channel.

In an embodiment, the light signal of the first channel includes forward-scattered light, side-scattered light, and fluorescence; and the light signal of the second channel includes forward-scattered light, side-scattered light, and fluorescence.

According to the sample analysis apparatus and the sample analysis method in the above embodiments, the lymphocyte result of the first test sample may be corrected based on the lymphocyte result of the second test sample, thereby effectively improving the accuracy of the white blood cell differential result.

DESCRIPTION OF THE PREFERRED EMBODIMENTS

The disclosure will be further described in detail below through specific implementations in conjunction with the accompanying drawings. Associated similar element reference numerals are used for similar elements in different implementations. In the following implementations, many details are described such that the disclosure may be better understood. However, it may be readily appreciated by persons skilled in the art that some of the features may be omitted, or may be substituted by other elements, materials, and methods in different cases. In certain cases, some operations involved in the disclosure are not displayed or described in the specification, which is to prevent a core part of the disclosure from being obscured by excessive description. Moreover, for persons skilled in the art, the detailed description of the involved operations is not necessary, and the involved operations can be thoroughly understood according to the description in the specification and general technical knowledge in the art.

In addition, the characteristics, operations, or features described in the specification may be combined in any appropriate manner to form various implementations. In addition, the steps or actions in the method description may also be exchanged or adjusted in their order in a way that is known to persons skilled in the art. Therefore, the various orders in the specification and the accompanying drawings are merely for the purpose of clear description of a certain embodiment and are not meant to be a necessary order unless it is otherwise stated that a certain order must be followed.

The serial numbers themselves for the components herein, for example, "first" and "second", are merely used to distinguish the described objects, and do not have any sequential or technical meaning. Moreover, as used in the disclosure, "connection" or "coupling", unless otherwise stated, includes both direct and indirect connections (couplings).

There are many existing white blood cell count and differential detection methods, such as a method using laser light scattering combined with fluorescent staining, a method using chemical staining and laser light scattering combined with impedance, etc., among which two independent channels are generally used for a white blood cell four-part differential (neutrophils, eosinophils, lymphocytes, and monocytes) and a basophil differential, respectively, and a white blood cell five-part differential result is obtained based on comprehensive information of the two channels.

Figure 1:
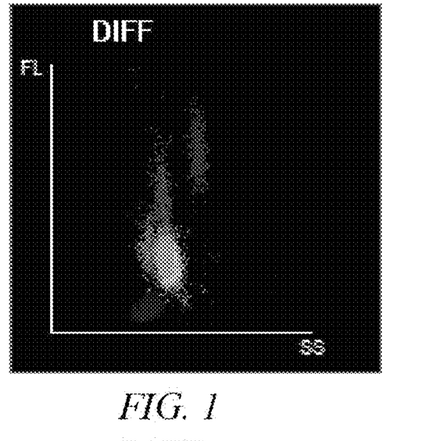
FIG. 1 is a schematic scattergram of a white blood cell differential result of a cat blood sample detected in a DIFF channel on a blood analysis device according to an embodiment.
Figure 2:
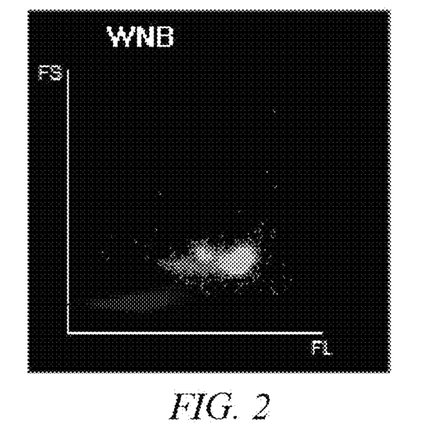
FIG. 2 is a schematic scattergram of a white blood cell differential result of a cat blood sample detected in a WNB channel on a blood analysis device according to an embodiment.

The inventors found through research that there is a defect in the white blood cell four-part differential result that is obtained using only the DIFF channel in the fluorescent staining method, and a differential error may occur due to unclear boundaries between lymphocytes and neutrophils, which leads to inaccurate detection results of lymphocytes and neutrophils, eventually leading to clinical diagnosis accidents. For example, FIG. 1 shows a white blood cell differential result of a cat blood sample detected in a DIFF channel on a blood analysis device, where a lymphocyte (Lym) differential count is higher, and a lymphocyte percentage count result is 68.2%, while an actual lymphocyte percentage result obtained through manual microscopic examination is 10.1%. However, in a WNB channel, a Lym particle cluster and a Neu particle cluster are clearly differentiated from each other, as shown in FIG. 2. Based on this finding, the inventors propose a method for differentiating lymphocytes from neutrophils using two measurement channels, to improve the accuracy of a white blood cell differential result.

It should be noted that the WNB channel in the specification is a channel capable of counting white blood cells, counting nucleated red blood cells, and differentiating eosinophils from the erythroblasts.

Figure 3:
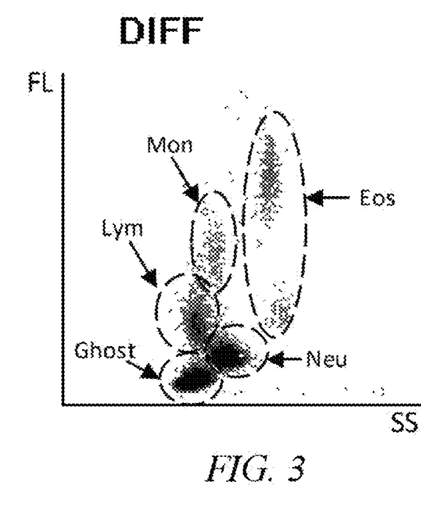
FIG. 3 is a schematic scattergram of a blood sample in a DIFF channel according to an embodiment.
Figure 4:
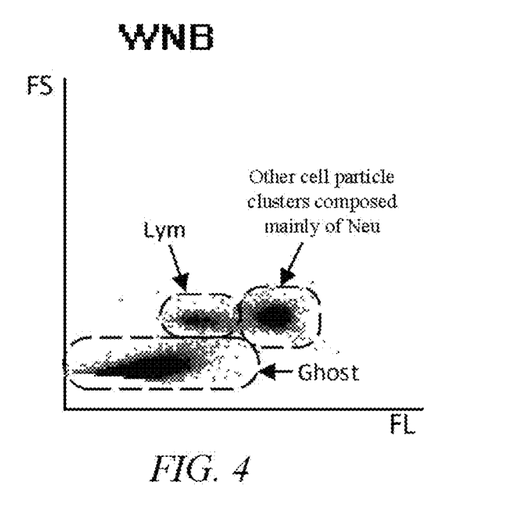
FIG. 4 is a schematic scattergram of a blood sample in a WNB channel according to an embodiment.

In some examples, two measurement channels used in the disclosure may be a DIFF channel and a WNB channel, flow cytometry may be used for the two channels, and three detection signals may be obtained: a forward-scattered (FS) light intensity signal used to detect a cell volume; a side-scattered (SS) light intensity signal that may be used to detect the internal complexity of cells; and a fluorescence (FL) intensity signal that may be used to detect the nucleic acid content of cells. These are further mentioned below. FIG. 3 and FIG. 4 are scattergrams showing distribution positions of various cell particles in a DIFF channel and a WNB channel, respectively. In the examples shown in the figures, the distribution positions of lymphocytes (Lym) are clearly visible. However, in an actual test process, for some blood samples, there are often unclear or adhesion boundaries between lymphocytes (Lym) and neutrophils (Neu) in the DIFF channel, resulting in an error in differentiating Lym particles from Neu particles in the DIFF channel, for example, as shown in FIG. 1 mentioned above as an example, in which an inaccurate parameter result is obtained, affecting clinical diagnostic conclusions. However, due to a difference in channel characteristics, in the WNB channel, Lym particle clusters can be clearly differentiated from other cell particle clusters composed mainly of Neu, as shown in FIG. 2 mentioned above as an example. Therefore, the inventor considers Lym particle differentiation in the WNB channel, to avoid a Lym differentiation error in the DIFF channel and to obtain an accurate white blood cell parameter calculation result.

For example, in some examples, solutions may be designed according to the following steps.

(1) In the DIFF channel, the cell particles are grouped by clustering to obtain a white blood cell four-part differential result, in which a lymphocyte percentage result is recorded as Lym %_D. In some examples, Lym %_D is a percentage obtained, after ghost is removed, by dividing the number of lymphocytes by the total number of the four types.

(2) In the WNB channel, the cell particles are also grouped by clustering to obtain a lymphocyte percentage result recorded as Lym %_N.

(3) A designed switching rule is used to decide whether to choose Lym %_D or Lym %_N as a final Lym % parameter result, or to calculate the final Lym % parameter result based on the two.

(4) A final Neu % parameter result is calculated, for example, Neu %=1−Lym %−Mon %−Eos %−Baso %, where Neu %, Lym %, Mon %, Eos %, and Baso % respectively refer to a neutrophil percentage result, a lymphocyte percentage result, a monocyte percentage result, an eosinophil percentage result, and a basophil percentage result.

It may be understood that the above steps (1) and (2) are for measurement of the same blood sample.

A more detailed description of the disclosure is given below.

Figure 5:
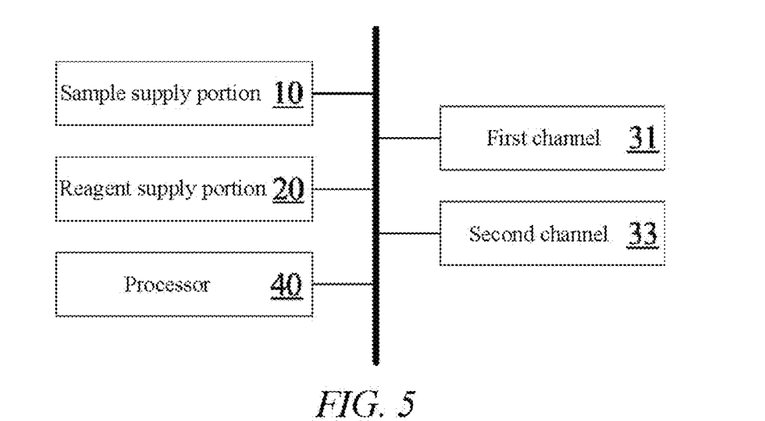
FIG. 5 is a schematic structural diagram of a sample analysis apparatus according to an embodiment.

A sample analysis apparatus is disclosed in some embodiments of the disclosure. Referring to FIG. 5, the sample analysis apparatus of some embodiments includes a blood sample supply portion 10, a reagent supply portion 20, a first channel 31, a second channel 33, and a processor 40. In some specific embodiments, the blood sample supply portion 10 is configured to supply a blood sample; the reagent supply portion 20 is configured to supply a reagent, for example, supply a first-channel reagent, a second-channel reagent, and the like; the first channel 31 is configured to receive the blood sample provided by the blood sample supply portion 10 and the first-channel reagent provided by the reagent supply portion 20, so as to prepare a first test sample, and obtain a light signal generated after the first test sample is irradiated with light; the second channel 33 is configured to receive the blood sample provided by the blood sample supply portion 10 and the second-channel reagent provided by the reagent supply portion 20, so as to prepare a second test sample, and obtain a light signal generated after the second test sample is irradiated with light; and the processor 40 is configured to calculate a detection result based on the light signals. In some embodiments of the disclosure, the processor 40 includes, but is not limited to, a central processing unit (CPU), a microcontroller unit (MCU), a field-programmable gate array (FPGA), a digital signal processor (DSP), and other devices configured to interpret computer instructions and process data in computer software. In some embodiments, the processor 40 is configured to execute various computer applications in the non-transitory computer-readable storage medium, so that the sample analysis apparatus performs the corresponding detection process.

The components are further described below.

In some embodiments, the blood sample supply portion 10 may include a sample needle, and the sample needle performs two-dimensional or three-dimensional movement in space through a two-dimensional or three-dimensional driving mechanism, so that the sample needle can move to aspirate a sample in a container (such as a sample tube) carrying the sample, and then move to a site for a reaction between a tested sample and a reagent, such as the first channel 31 or the second channel 33, to add blood samples to the site.

In some embodiments, the reagent supply portion 20 may include an area for carrying a reagent container and a reagent liquid path communicating the reagent container with the first channel 31 and the second channel 33, and the reagent is added from the reagent container to the first channel 31 and the second channel 33 through the reagent liquid path. In some embodiments, the reagent supply portion 20 may also include a reagent needle, and the reagent needle performs two-dimensional or three-dimensional movement in space through a two-dimensional or three-dimensional driving mechanism, so that the reagent needle may move to aspirate the reagent in the reagent container, and then move to a site for a reaction between a tested sample and the reagent, such as the first channel 31 or the second channel 33, to add the reagent to the site.

The reagent supply portion 20 may provide a first-channel reagent and a second-channel reagent. In some embodiments, the first-channel reagent includes a hemolytic agent, a fluorescent reagent, and the like. In some embodiments, the second-channel reagent includes a hemolytic agent, a fluorescent reagent, and the like. In some embodiments, the fluorescent reagent included in the first-channel reagent is different from the fluorescent reagent included in the second-channel reagent.

The first channel 31 and the second channel 33 each can prepare a test sample from the blood sample and the reagent, and obtain a light signal generated after the test sample is irradiated with light. In some embodiments, the first channel 31 may include two structures of a reaction cell and a measurement portion, and the reaction cell may provide a site for a reaction between the sample and the reagent. In some embodiments, the second channel 33 may include two structures of a reaction cell and a measurement portion, and the reaction cell may provide a site for a reaction between the sample and the reagent. In some embodiments, the first channel 31 and the second channel 33 may have their respective reaction cells, or may share the same reaction cell. In some embodiments, the first channel 31 and the second channel 33 may have their respective measurement portions, or may share the same measurement portion.

In some embodiments, the measurement portion includes an optical detection portion, which is described in detail below.

In some embodiments, the measurement portion includes an optical detection portion, the optical detection portion can measure a sample according to the laser light scattering principle, and the principle is as follows: after cells are irradiated by laser light, light signals such as a scattering light signal and a fluorescence signal may be generated, and the cells may be differentiated and counted by collecting the signals. Certainly, in some embodiments, if the cells are not treated with a fluorescent reagent, no fluorescence can be collected. The optical detection portion will be described below.

In some embodiments, the optical detection portion can measure the sample according to the laser light scattering principle, and the principle is as follows: Cells are differentiated and counted by collecting light signals such as a scattering light signal and a fluorescence signal that are generated after the cells are irradiated by laser light. Certainly, in some embodiments, if the cells are not treated with a fluorescent reagent, no fluorescence can be collected. The optical detection portion will be described below.

Figure 6:
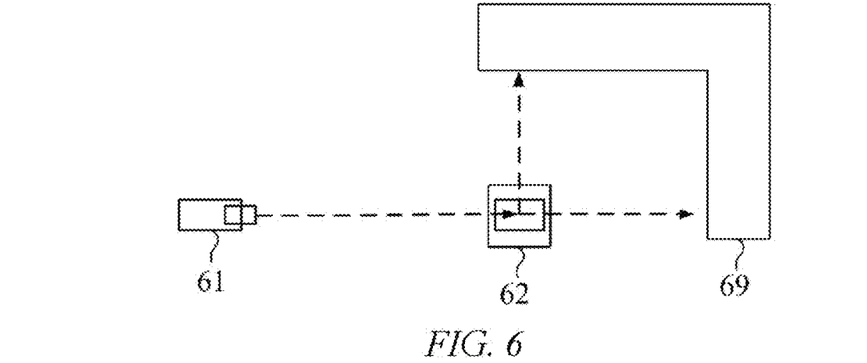
FIG. 6 is a schematic structural diagram of an optical detection portion according to an embodiment.
Figure 7:
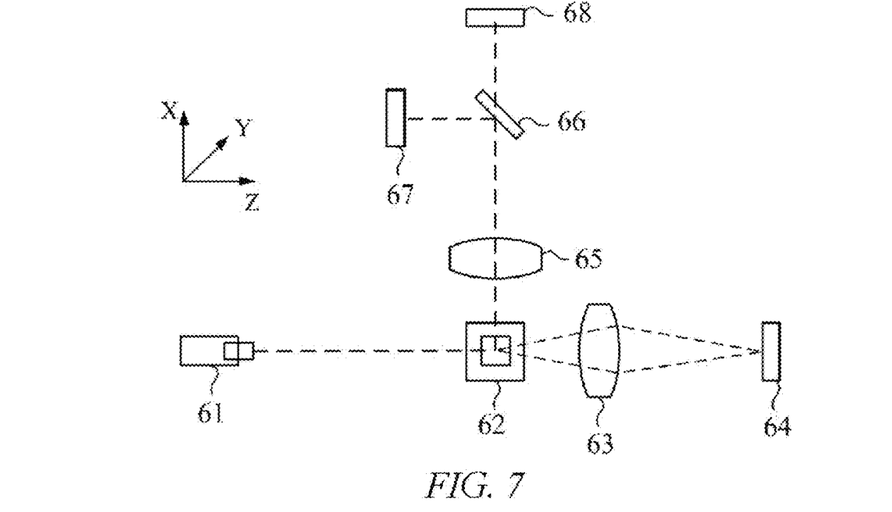
FIG. 7 is a schematic structural diagram of an optical detection portion according to an embodiment.

Referring to FIG. 6, the optical detection portion may include a light source 61, a flow cell 62, and an optical detector 69. The flow cell 62 is in communication with the reaction cell and is configured to allow cells of a test sample to be tested, such as the first test sample or the second test sample, to pass through one by one. The light source 61 is configured to irradiate the cells passing through the flow cell 62, and the optical detector 69 is configured to obtain a light signal of the cells passing through the flow cell 62. FIG. 7 is used as a specific example of the optical detection portion, in which the optical detector 69 may include a lens group 63 configured to collect forward-scattered light, a photoelectric detector 64 configured to convert the collected forward-scattered light from an optical signal into an electrical signal, a lens group 65 configured to collect side-scattered light and side fluorescence, a dichroscope 66, a photoelectric detector 67 configured to convert the collected side-scattered light from an optical signal into an electrical signal, and a photoelectric detector 68 configured to convert the collected side fluorescence from an optical signal into an electrical signal, wherein the dichroscope 66 is configured to split light and divide the mixed side-scattered light and side fluorescence into two paths, one path for the side-scattered light, and the other path for the side fluorescence. It should be noted that the light signals herein may be either optical signals or electrical signals obtained by conversion from the optical signals, and the optical signals and electrical signals are essentially the same in information contained in representing cell detection results.

How the optical detection portion specifically obtains a light signal of the test sample to be tested is described by taking the structure of the optical detection portion shown in FIG. 7 as an example.

Figure 8:
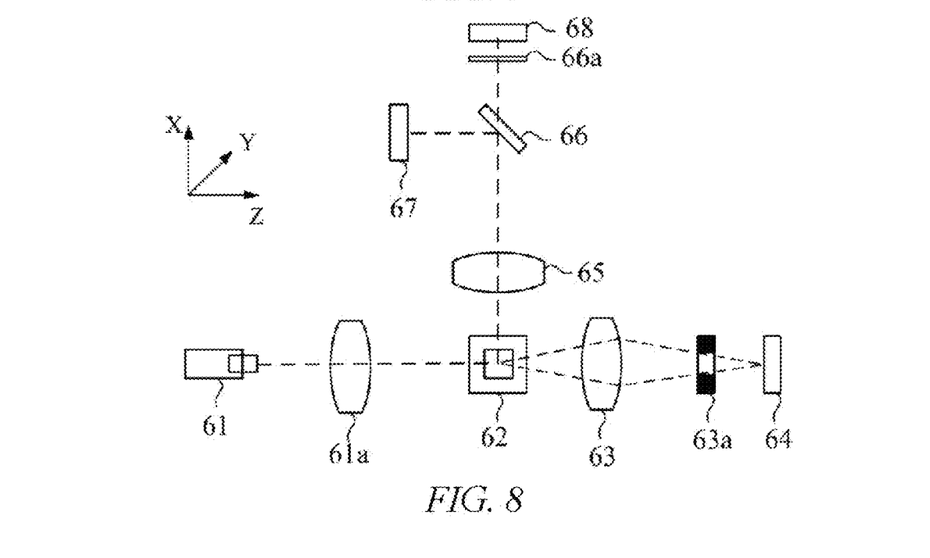
FIG. 8 is a schematic structural diagram of an optical detection portion according to an embodiment.

The flow cell 62 is configured to allow the cells of the test sample to be tested to pass through one by one. For example, after the red blood cells in the prepared test sample to be tested are dissolved by one or more reagents such as a hemolytic agent in the reaction cell or further dyed with a fluorescent agent, a sheath flow technology is used to enable the cells in the sample to sequentially pass through the flow cell 62 one by one. The Y-axis direction in the figure is the direction of movement of the cells in the test sample to be tested, and it should be noted that the Y-axis direction in the figure is a direction perpendicular to a paper plane. The light source 61 is configured to irradiate the cells passing through the flow cell 62. In some embodiments, the light source 61 is a laser, such as a helium-neon laser or a semiconductor laser. The light from the light source 61 will be scattered all around when irradiating the cells in the flow cell 62. Therefore, when the cells in the prepared test sample to be tested pass through the flow cell 62 one by one by virtue of a sheath flow, the light emitted by the light source 61 irradiates the cells passing through the flow cell 62, and the light irradiated on the cells will be scattered all around. The forward-scattered light (for example, in a Z-axis direction in the figure) is collected by the lens group 63 to reach the photoelectric detector 64, such that an information processing portion 70 can obtain the forward-scattered light information of the cells from the photoelectric detector 64; and at the same time, side light (for example, in an X-axis direction in the figure) is collected by the lens group 65 in a direction perpendicular to a direction in which light rays are irradiated on the cells, and the collected side light is further reflected and refracted by the dichroscope 66, wherein side-scattered light in the side light is reflected by the dichroscope 66 when passing through the dichroscope and then reaches the corresponding photoelectric detector 67, and side fluorescence in the side light also reaches the corresponding photoelectric detector 68 after being refracted or transmitted, so that the processor 40 may obtain side-scattered light information of the cells from the photoelectric detector 67 and obtain side fluorescence information of the cells from the photoelectric detector 68. Referring to FIG. 8, which is used as another example of the optical detection portion 60. To make the performance of the light from the light source 61 irradiated on the flow cell 62 better, a collimating lens 61*a* may be introduced between the light source 61 and the flow cell 62. The light emitted by the light source 61 is collimated by the collimating lens 61*a* and then irradiated on the cells passing through the flow cell 62. In some examples, in order to reduce noise in the collected fluorescence (that is, no interference from other light), an optical filter 66*a* may be further provided in front of the photoelectric detector 68, and the side fluorescence after splitting by the dichroscope 66 will pass through the optical filter 66*a* before reaching the photoelectric detector 68. In some embodiments, after the lens group 63 collects the forward-scattered light, a diaphragm 63*a* is further introduced to limit an angle of the forward-scattered light that finally reaches the photoelectric detector 64, for example, the forward-scattered light is limited to be low-angle (or small-angle) forward-scattered light.

The white blood cells may be differentiated and counted by using a laser scattering method, and the optical detection portion 60 described above is construed as an example. The scattered light generated by irradiating the cells with a laser beam is related to the size of the cells, the refractive index of cell membranes and the refractive index of internal structures of the cells. According to a scattered light signal, a distribution diagram showing the size of blood cells and the internal information of the cells can be obtained, and is called a scattergram.

The above are some descriptions of the sample analysis apparatus.

In some embodiments, the processor 40 is capable of performing a white blood cell four-part differential based on the light signal of the first channel 31, and the white blood cell four-part differential includes a neutrophil result, an eosinophil result, a lymphocyte result, and a monocyte result.

In some embodiments, the processor 40 is capable of obtaining at least a nucleated red blood cell result based on the light signal of the second channel 33. In some embodiments, the processor 40 is further capable of obtaining a white blood cell count result and/or a basophil result based on the light signal of the second channel 33.

In some embodiments, the basophil result includes a percentage of basophils in white blood cells.

In some embodiments, the neutrophil result includes a percentage of neutrophils in the white blood cells, the eosinophil result includes a percentage of eosinophils in the white blood cells, the lymphocyte result includes a percentage of lymphocytes in the white blood cells, and the monocyte result includes a percentage of monocytes in the white blood cells.

The above is related to the light signals of the first channel 31 and the second channel 33. In some embodiments, the light signal of the first channel 31 includes forward-scattered (FSC) light, side-scattered (SSC) light, and fluorescence such as side fluorescence (SFL). In some embodiments, the light signal of the second channel 33 includes forward-scattered (FSC) light, side-scattered (SSC) light, and fluorescence such as side fluorescence (SFL).

In some embodiments, the first channel 31 is a DIFF channel.

In some embodiments, the second channel 33 is a WNB channel.

The above are some descriptions about the first channel 31 and the second channel 33.

The lymphocyte result obtained by the processor 40 based on the light signal of the second channel is described below.

In some embodiments, the light signal of the second channel 33 includes at least forward-scattered light and side-scattered light; the processor 40 generates a second scattergram based on the forward-scattered light and the side-scattered light of the second channel 33; and the processor 40 calculates the lymphocyte result of the second channel 33 based on the second scattergram, completes the differentiation of Lym particles under the viewing angle (that is, under the scattergram), and further calculates a differential and count result, that is, a percentage obtained by dividing the number of the Lym particles by the total number of white blood cell (WBC) particles.

Figure 9:
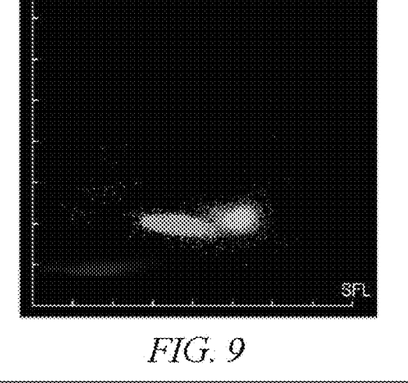
FIG. 9 is an example of a complete differential result of the second channel displayed by a sample analysis apparatus by using, for example, a display according to some embodiments.

FIG. 9 shows an example of a complete differential result of the second channel 33 displayed by the sample analysis apparatus by using, for example, a display.

In some embodiments, the light signal of the second channel 33 includes at least side-scattered light and fluorescence. The processor 40 generates a third scattergram based on the side-scattered light and the fluorescence of the second channel 33; and the processor 40 calculates the lymphocyte result of the second channel 33 based on the third scattergram.

In some embodiments, the light signal of the second channel 33 includes at least forward-scattered light and fluorescence; the processor 40 generates a fourth scattergram based on the forward-scattered light and the fluorescence of the second channel 33; and the processor 40 calculates the lymphocyte result of the second channel 33 based on the fourth scattergram.

In some embodiments, the light signal of the second channel 33 includes forward-scattered light, side-scattered light, and fluorescence; the processor 40 generates a second scattergram based on the forward-scattered light and the side-scattered light of the second channel 33; and the processor 40 calculates a first lymphocyte result of the second channel 33 based on the second scattergram; the processor 40 generates a third scattergram based on the side-scattered light and the fluorescence of the second channel 33; and calculates a second lymphocyte result of the second channel 33 based on the third scattergram; and the processor 40 calculates the lymphocyte result of the second channel 33 by, for example, calculating a weighted sum of the first lymphocyte result and the second lymphocyte result of the second channel 33. For example:

the lymphocyte result of the second channel=the first lymphocyte result×a+the second lymphocyte result×(1−a), where a is a number greater than 0 and less than 1.

In some embodiments, the light signal of the second channel 33 includes forward-scattered light, side-scattered light, and fluorescence; the processor 40 generates a second scattergram based on the forward-scattered light and the side-scattered light of the second channel 33; the processor 40 calculates a first lymphocyte result of the second channel 33 based on the second scattergram; the processor 40 generates a fourth scattergram based on the forward-scattered light and the fluorescence of the second channel 33, and calculates a third lymphocyte result of the second channel 33 based on the fourth scattergram; and the processor 40 calculates the lymphocyte result of the second channel 33 by, for example, calculating a weighted sum of the first lymphocyte result and the third lymphocyte result of the second channel 33. For example:

the lymphocyte result of the second channel=the first lymphocyte result×b+the third lymphocyte result×(1−b), where b is a number greater than 0 and less than 1.

In some embodiments, the light signal of the second channel 33 includes forward-scattered light, side-scattered light, and fluorescence; the processor 40 generates a third scattergram based on the side-scattered light and the fluorescence of the second channel 33; the processor 40 calculates a second lymphocyte result of the second channel 33 based on the third scattergram; the processor 40 generates a fourth scattergram based on the forward-scattered light and the fluorescence of the second channel 33, and calculates a third lymphocyte result of the second channel 33 based on the fourth scattergram; and the processor 40 calculates the lymphocyte result of the second channel 33 by, for example, calculating a weighted sum of the second lymphocyte result and the third lymphocyte result of the second channel 33. For example:

the lymphocyte result of the second channel=the second lymphocyte result×c+the third lymphocyte result×(1−c), where c is a number greater than 0 and less than 1.

In some embodiments, the processor 40 can obtain the lymphocyte result based on the light signal of the second channel 33, to correct the lymphocyte result of the first channel 31. It may be understood that the first test sample of the first channel and the second test sample of the second channel are prepared from the same blood sample, so that the processor 40 corrects the lymphocyte result of the first channel 31 based on the lymphocyte result obtained based on the light signal of the second channel 33.

In some embodiments, the processor 40 determines whether the lymphocyte result of the first channel 31 is accurate, based on the light signal of the first channel 31 or a deviation between the lymphocyte result of the first channel 31 and the lymphocyte result of the second channel 33; and when it is determined that the lymphocyte result is inaccurate (that is, the lymphocyte result of the first channel 31 is inaccurate), the processor 40 corrects the lymphocyte result of the first channel 31 based on the lymphocyte result of the second channel 33, for example, the processor 40 uses the lymphocyte result of the second channel 33 as a lymphocyte result to be output by the sample analysis apparatus. As another example, the processor 40 calculates a weighted sum of the lymphocyte result of the first channel 31 and the lymphocyte result of the second channel 33 as a lymphocyte result to be output by the sample analysis apparatus. For example:

the lymphocyte result to be output by the sample analysis apparatus=the lymphocyte result of the first channel×d+the lymphocyte result of the second channel 33×(1−d), where d is a number greater than 0 and less than 1. In addition, if d is 0, the lymphocyte result of the second channel 33 is used as the lymphocyte result to be output by the sample analysis apparatus, or if d is 1, the lymphocyte result of the first channel 31 is used as the lymphocyte result to be output by the sample analysis apparatus.

In the above process, the processor 40 may determine whether the lymphocyte result of the first channel 31 is accurate, based on the light signal of the first channel 31: the processor 40 generates a first scattergram based on the side-scattered light and the fluorescence of the first channel 31; and the processor 40 determines whether there are clear boundaries between a lymphocyte population and a neutrophil population, based on the first scattergram, and if there are no clear boundaries, determines that the lymphocyte result of the first channel 31 is inaccurate.

In the above process, the processor 40 may alternatively determine whether the lymphocyte result of the first channel 31 is accurate, based on a deviation between the lymphocyte result of the first channel 31 and the lymphocyte result of the second channel 33. Specifically, a range may be set. When the deviation between the lymphocyte result of the first channel 31 and the lymphocyte result of the second channel 33 (for example, a difference between the two) is within the range, the lymphocyte result of the first channel 31 is considered to be accurate; otherwise, the lymphocyte result of the first channel 31 is considered to be inaccurate.

In some embodiments, the processor 40 can further calculate a neutrophil result based on the eosinophil result and the monocyte result of the first channel 31, the basophil result of the second channel 33, and a corrected lymphocyte result, and using the neutrophil result as a neutrophil result to be output by the sample analysis apparatus.

Some embodiments of the disclosure further provide a sample analysis method, which is described in detail below.

Figure 10:
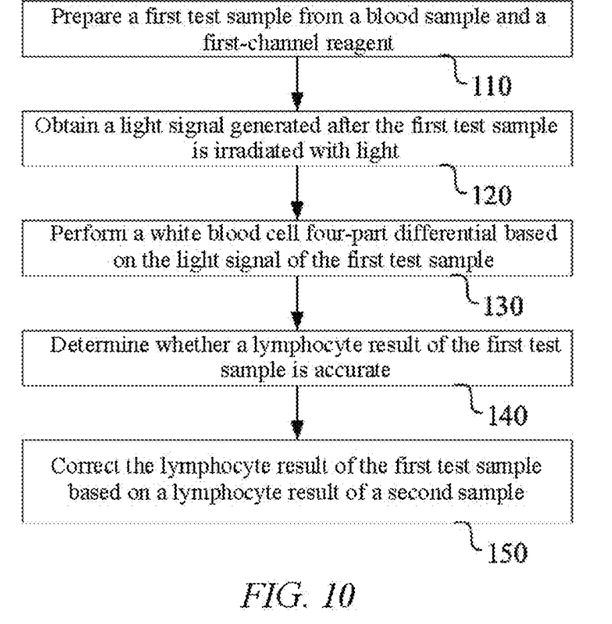
FIG. 10 is a flowchart of a sample analysis method according to an embodiment.

Referring to FIG. 10, the sample analysis method of some embodiments includes the following steps:

step 110: preparing a first test sample from a blood sample and a first-channel reagent;

step 120: obtaining a light signal generated after the first test sample is irradiated with light;

step 130: performing a white blood cell four-part differential based on the light signal of the first test sample, the white blood cell four-part differential including a neutrophil result, an eosinophil result, a lymphocyte result, and a monocyte result;

step 140: determining whether the lymphocyte result of the first test sample is accurate; and step 150: when it is determined that the lymphocyte result is inaccurate, correcting the lymphocyte result of the first test sample based on a lymphocyte result of a second test sample, where the second test sample is prepared from the blood sample and a second-channel reagent, that is, the first test sample and the second test sample are prepared from the same blood sample. A light signal generated after the second test sample is irradiated with light can be used to calculate a nucleated red blood cell result and a lymphocyte result. In some embodiments, the light signal generated after the second test sample is irradiated with light can be further used to obtain a white blood cell count result and/or a basophil result.

In some embodiments, correcting the lymphocyte result of the first test sample based on a lymphocyte result of a second test sample in step 150 may include using the lymphocyte result of the second channel as a lymphocyte result to be output, or may include calculating a weighted sum of the lymphocyte result of the first channel and the lymphocyte result of the second channel as the lymphocyte result to be output.

In some embodiments, the sample analysis method may further include the step of: calculating a neutrophil result based on the eosinophil result and the monocyte result of the first channel, the basophil result of the second channel, and a corrected lymphocyte result, and using the neutrophil result as a neutrophil result to be output.

A key point of the above step lies in how to calculate the lymphocyte result based on the light signal generated after the second test sample is irradiated with light, which is described in detail below.

Figure 11:
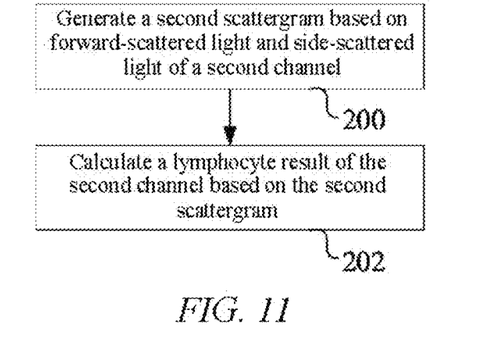
FIG. 11 is a flowchart of calculating a lymphocyte result based on a light signal generated after a second test sample is irradiated with light according to an embodiment.

Referring to FIG. 11, in some embodiments, calculating a lymphocyte result based on the light signal generated after the second test sample is irradiated with light includes the following steps:
step 200: generating a second scattergram based on the forward-scattered light and the side-scattered light of the second channel, where the light signal of the second channel includes at least forward-scattered light and side-scattered light; and step 202: calculating a first lymphocyte result of the second channel based on the second scattergram, where the first lymphocyte result of the second channel may be used as the lymphocyte result of the second channel.

Figure 12:
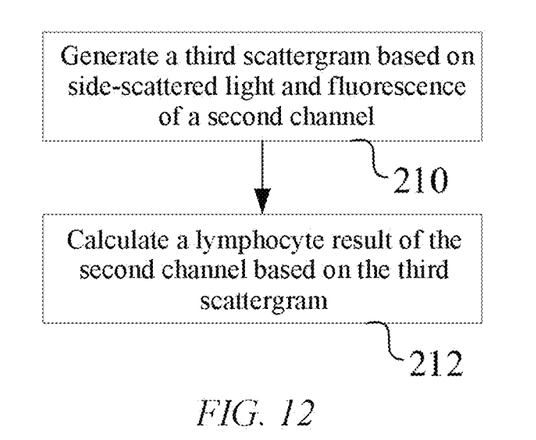
FIG. 12 is a flowchart of calculating a lymphocyte result based on a light signal generated after a second test sample is irradiated with light according to an embodiment.

Referring to FIG. 12, in some embodiments, calculating a lymphocyte result based on the light signal generated after the second test sample is irradiated with light includes the following steps:
step 210: generating a third scattergram based on the side-scattered light and the fluorescence of the second channel, where the light signal of the second channel includes at least side-scattered light and fluorescence; and step 212: calculating a second lymphocyte result of the second channel based on the third scattergram, where the second lymphocyte result of the second channel may be used as the lymphocyte result of the second channel.

Figure 13:
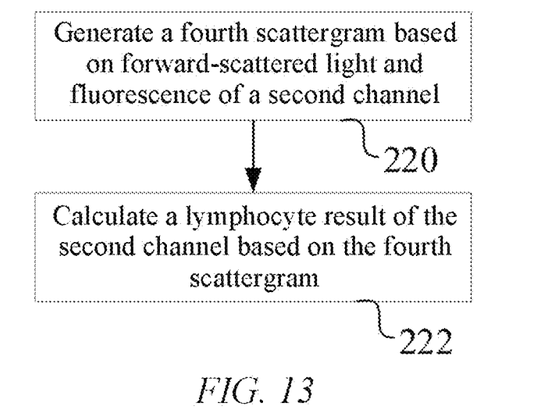
FIG. 13 is a flowchart of calculating a lymphocyte result based on a light signal generated after a second test sample is irradiated with light according to an embodiment.

Referring to FIG. 13, in some embodiments, calculating a lymphocyte result based on the light signal generated after the second test sample is irradiated with light includes the following steps:
step 220: generating a fourth scattergram based on the forward-scattered light and the fluorescence of the second channel, where the light signal of the second channel includes at least forward-scattered light and fluorescence; and step 222: calculating a third lymphocyte result of the second channel based on the fourth scattergram, where the third lymphocyte result of the second channel may be used as the lymphocyte result of the second channel.

In other embodiments, the lymphocyte result of the second channel may alternatively be calculated by, for example, calculating a weighted sum of the first lymphocyte result and the second lymphocyte result of the second channel, to calculate the lymphocyte result of the second channel.

In other embodiments, the lymphocyte result of the second channel may alternatively be calculated by, for example, calculating a weighted sum of the first lymphocyte result and the third lymphocyte result of the second channel, to calculate the lymphocyte result of the second channel.

In other embodiments, the lymphocyte result of the second channel may alternatively be calculated by, for example, calculating a weighted sum of the second lymphocyte result and the third lymphocyte result of the second channel, to calculate the lymphocyte result of the second channel.

In some embodiments, the first channel is a DIFF channel. In some embodiments, the second channel is a WNB channel.

The above is related to the light signals of the first channel 31 and the second channel 33. In some embodiments, the light signal of the first channel 31 includes forward-scattered (FSC) light, side-scattered (SSC) light, and fluorescence such as side fluorescence (SFL). In some embodiments, the light signal of the second channel 33 includes forward-scattered (FSC) light, side-scattered (SSC) light, and fluorescence such as side fluorescence (SFL).

In an example, the device used is a high-end veterinary blood cell analyzer BC-75R Vet (a sample analysis apparatus to which the solutions of the disclosure are applied) produced by Shenzhen Mindray Animal Medical Technology Co., LTD., more than 50 cat blood samples are randomly selected, and each of the samples is used to prepare two samples, to be used for the following tests, respectively:
(1) One of the samples is tested on the high-end veterinary blood cell analyzer BC-75R Vet to obtain a lymphocyte content Lym % measurement result and a neutrophil content Neu % measurement result of the corresponding sample, as well as a lymphocyte content Lym %_D measurement result and a neutrophil content Neu %_D measurement result calculated by relying only on the DIFF channel.

(2) The other sample is manually examined by a professional doctor by using a microscope to calculate a lymphocyte content Lym % measurement result and a neutrophil content Neu % measurement result of the corresponding sample.

Figure 14:
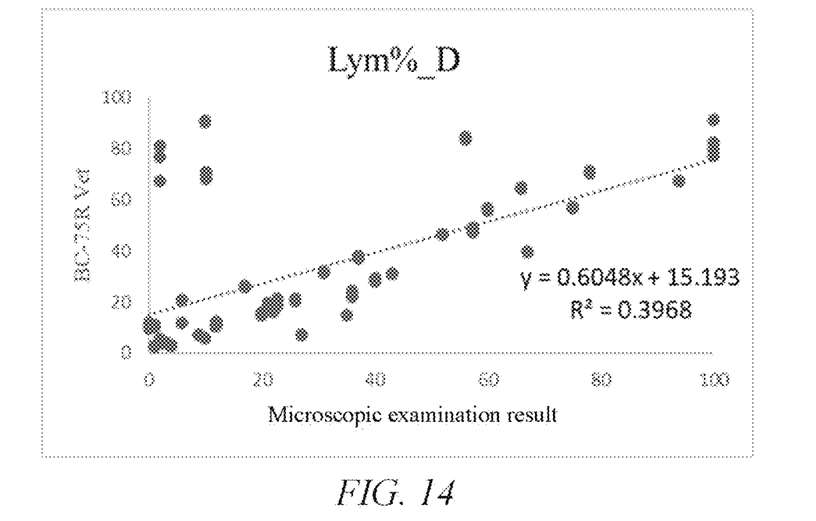
FIG. 14 is a schematic diagram of correlation between Lym %_D of a cat blood sample and a manual microscopic examination result of the cat blood sample.
Figure 15:
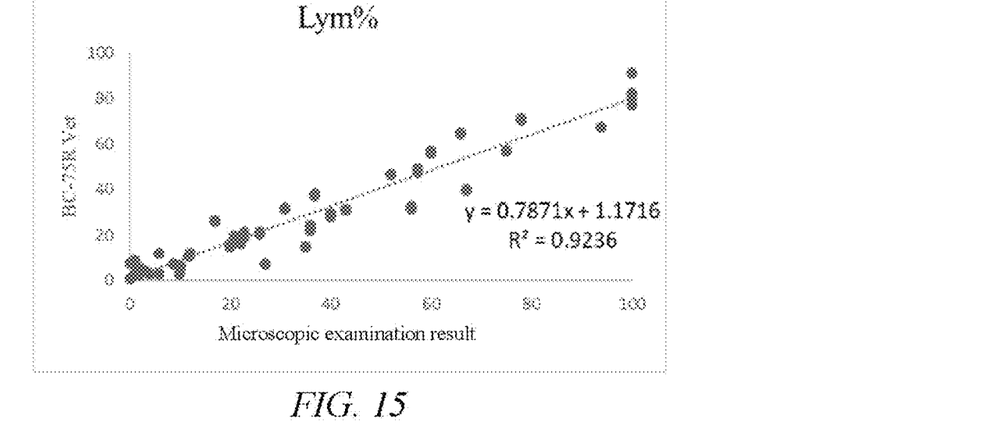
FIG. 15 is a schematic diagram of correlation between Lym % of a cat blood sample and a manual microscopic examination result of the cat blood sample.

The two lymphocyte content measurement results of the sample tested on the blood cell analyzer are compared with the manual microscopic examination result, and comparison results are shown in FIG. 14 and FIG. 15. It can be seen from the diagrams mentioned above that:

The lymphocyte content (Lym % obtained by BC-75R Vet, represented by the ordinate in the figure) calculated using the method in the specification has a good correlation with the lymphocyte content (Lym % obtained by microscopic examination and represented by the abscissa in the figure) obtained by manual microscopic examination, and a coefficient R of the correlation reaches 0.961, that is, the method in the specification may be used to accurately obtain the lymphocyte content Lym %.

Figure 16:
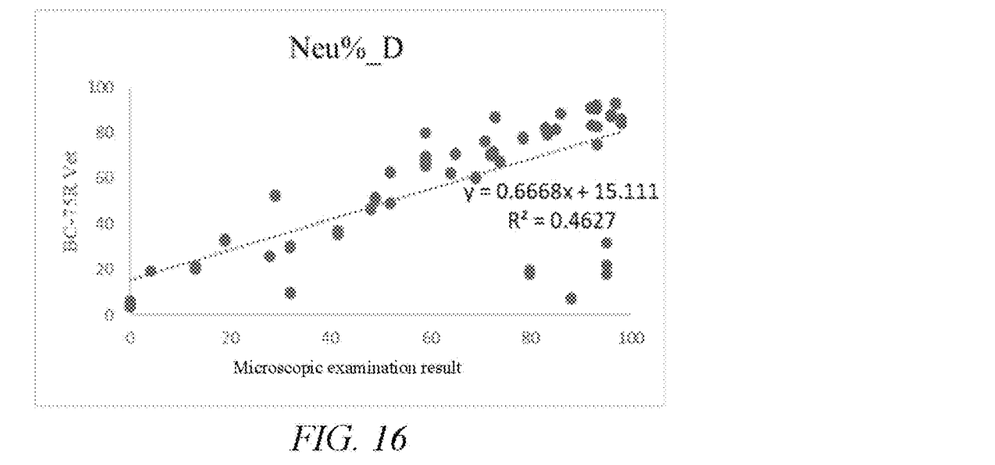
FIG. 16 is a schematic diagram of correlation between Neu %_D of a cat blood sample and a manual microscopic examination result of the cat blood sample.
Figure 17:
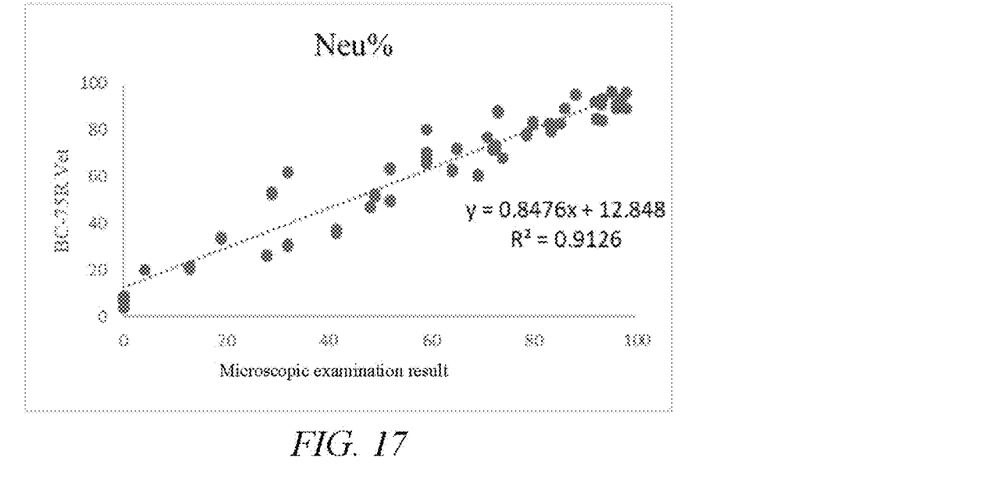
FIG. 17 is a schematic diagram of correlation between Neu % of a cat blood sample and a manual microscopic examination result of the cat blood sample.

The two neutrophil content measurement results of the sample tested on the blood cell analyzer are compared with the manual microscopic examination result, and the results are shown in FIG. 16 and FIG. 17. It can be seen from the diagrams mentioned above that:

The neutrophil content (Neu % obtained by BC-75R Vet and represented by the ordinate in the figure) calculated using the method in the specification has a good correlation with the neutrophil content (Neu % obtained by microscopic examination and represented by the abscissa in the figure) obtained by manual microscopic examination, and a coefficient R of the correlation reaches 0.955, that is, the method in the specification may be used to accurately obtain the neutrophil content Neu %.

It can be seen that the sample analysis apparatus and the sample analysis method in some embodiments of the disclosure, the accuracy of the white blood cell five-part differential result may be effectively improved.

Descriptions are provided herein with reference to various exemplary embodiments. However, those skilled in the art should understand that changes and corrections may be made to the exemplary embodiments without departing from the scope of this specification. For example, various operational steps and assemblies for executing the operational steps may be implemented in different methods on the basis of specific applications or in consideration of any number of functions associated with operations of the system (for example, one or more steps may be deleted, modified or incorporated into other steps).

In addition, those skilled in the art can understand that the principles herein may be reflected in a computer program product in a computer-readable storage medium, where the readable storage medium is loaded with computer-readable program codes in advance. Any tangible non-transitory computer-readable storage medium may be used, including a magnetic storage device (a hard disk, a floppy disk, or the like), an optical storage device (CD-ROM, DVD, Blu-ray disc, or the like), a flash memory, and/or the like. These computer program instructions may be loaded on a general-purpose computer, a special-purpose computer, or other programmable data processing devices to form a machine, such that these instructions, when executed on a computer or other programmable data processing apparatuses, may produce a means for implementing a specified function. These computer program instructions may alternatively be stored in a computer-readable memory. The computer-readable memory may instruct a computer or other programmable data processing devices to operate in a particular manner, such that the instructions stored in the computer-readable memory may produce an article of manufacture which includes a means for implementing a specified function. The computer program instructions may alternatively be loaded onto a computer or other programmable data processing devices to perform a series of operational steps on the computer or other programmable devices to produce a computer-implemented process, such that the instructions, when executed on the computer or other programmable devices, may provide steps for implementing a specified function.

Although the principles herein are shown in various embodiments, many modifications of structures, arrangements, proportions, elements, materials, and components particularly applicable to specific environmental and operating requirements may be made without departing from the principles and scope of the disclosure. These modifications and other changes or corrections fall within the scope of this specification.

The foregoing detailed descriptions are provided with reference to various embodiments. However, those skilled in the art should understand that various corrections and changes may be made without departing from the scope of the disclosure. Therefore, the disclosure is intended for an illustrative purpose other than a limitative purpose, and all these modifications fall within the scope of the disclosure. Similarly, the advantages, other advantages, and solutions to problems of the various embodiments are described above. However, the benefits, the advantages, the solutions to the problems, and any of their contributing factors, or solutions clarifying them should not be construed to be critical, necessary, or essential. The term "include" used herein and any other variations thereof all refer to a non-exclusive inclusion, such that a process, method, article, or device including a list of elements includes not only these elements, but also other elements that are not expressly listed or not inherent to the process, method, system, article, or device. In addition, the term "couple" used herein and any other variations thereof refer to a physical connection, an electrical connection, a magnetic connection, an optical connection, a communication connection, a functional connection, and/or any other connections.

Those skilled in the art should understand that many changes may be made to the details of the foregoing embodiments without departing from the basic principles of the disclosure. Therefore, the scope of the disclosure may be determined in accordance with the following claims.

The invention claimed is:

1. A sample analysis apparatus, comprising:
    a blood sample supply portion including a sample needle, configured to supply a blood sample;
    a reagent supply portion, configured to supply a first-channel reagent and a second-channel reagent;
    a first channel configured to receive the blood sample provided by the blood sample supply portion and the first-channel reagent provided by the reagent supply portion, so as to prepare a first test sample, and obtain a light signal generated after the first test sample is irradiated with light;
    a second channel configured to receive the blood sample provided by the blood sample supply portion and the second-channel reagent provided by the reagent supply portion, so as to prepare a second test sample, and obtain a light signal generated after the second test sample is irradiated with light;
    the reagent supply portion including an area for carrying a reagent container and a reagent liquid path communicating the reagent container with the first channel and the second channel, and the reagent is added from the reagent container to the first channel and the second channel through the reagent liquid path; and
    a processor which is capable of performing a white blood cell four-part differential based on the light signal of the first channel, the white blood cell four-part differential comprising a neutrophil result, an eosinophil result, a lymphocyte result, and a monocyte result, wherein the processor is capable of obtaining at least a nucleated red blood cell result based on the light signal of the second channel, wherein the processor is further capable of obtaining a lymphocyte result based on the light signal of the second channel, to correct the lymphocyte result of the first channel.

2. The sample analysis apparatus of claim 1, wherein the processor determines whether the lymphocyte result of the first channel is accurate, based on the light signal of the first channel or a deviation between the lymphocyte result of the first test sample and the lymphocyte result of the second test sample; and when it is determined that the lymphocyte result is inaccurate, the processor corrects the lymphocyte result of the first channel based on the lymphocyte result of the second channel.

3. The sample analysis apparatus of claim 2, wherein the processor correcting the lymphocyte result of the first channel based on the lymphocyte result of the second channel comprises:

using, by the processor, the lymphocyte result of the second channel as a lymphocyte result to be output by the sample analysis apparatus.

4. The sample analysis apparatus of claim 2, wherein the processor correcting the lymphocyte result of the first channel based on the lymphocyte result of the second channel comprises:

calculating, by the processor, a weighted sum of the lymphocyte result of the first channel and the lymphocyte result of the second channel as a lymphocyte result to be output by the sample analysis apparatus.

5. The sample analysis apparatus of claim 2, wherein the processor determining whether the lymphocyte result of the first channel is accurate, based on the light signal of the first channel comprises:

the light signal of the first channel comprising at least side-scattered light and fluorescence;

generating, by the processor, a first scattergram based on the side-scattered light and the fluorescence of the first channel; and determining, by the processor, whether there are clear boundaries between a lymphocyte population and a neutrophil population, based on the first scattergram, and if there are no clear boundaries, determining that the lymphocyte result of the first channel is inaccurate.

6. The sample analysis apparatus of claim 1, wherein the processor being further capable of obtaining a lymphocyte result based on the light signal of the second channel comprises:

the light signal of the second channel comprising at least forward-scattered light and side-scattered light; generating, by the processor, a second scattergram based on the forward-scattered light and the side-scattered light of the second channel; and calculating, by the processor, the lymphocyte result of the second channel based on the second scattergram;

or the light signal of the second channel comprising at least side-scattered light and fluorescence; generating, by the processor, a third scattergram based on the side-scattered light and the fluorescence of the second channel; and calculating, by the processor, the lymphocyte result of the second channel based on the third scattergram;

or the light signal of the second channel comprising at least forward-scattered light and fluorescence; generating, by the processor, a fourth scattergram based on the forward-scattered light and the fluorescence of the second channel; and calculating, by the processor, the lymphocyte result of the second channel based on the fourth scattergram;

or the light signal of the second channel comprising forward-scattered light, side-scattered light, and fluorescence; generating, by the processor, a second scattergram based on the forward-scattered light and the side-scattered light of the second channel; and calculating, by the processor, a first lymphocyte result of the second channel based on the second scattergram; generating, by the processor, a third scattergram based on the side-scattered light and the fluorescence of the second channel; and calculating, by the processor, a second lymphocyte result of the second channel based on the third scattergram; and calculating, by the processor, the lymphocyte result of the second channel based on the first lymphocyte result and the second lymphocyte result of the second channel;

or the light signal of the second channel comprising forward-scattered light, side-scattered light, and fluorescence; generating, by the processor, a second scattergram based on the forward-scattered light and the side-scattered light of the second channel; and calculating, by the processor, a first lymphocyte result of the second channel based on the second scattergram; generating, by the processor, a fourth scattergram based on the forward-scattered light and the fluorescence of the second channel; and calculating, by the processor, a third lymphocyte result of the second channel based on the fourth scattergram; and calculating, by the processor, the lymphocyte result of the second channel based on the first lymphocyte result and the third lymphocyte result of the second channel;

or the light signal of the second channel comprising forward-scattered light, side-scattered light, and fluorescence; generating, by the processor, a third scattergram based on the side-scattered light and the fluorescence of the second channel; and calculating, by the processor, a second lymphocyte result of the second channel based on the third scattergram; and generating, by the processor, a fourth scattergram based on the forward-scattered light and the fluorescence of the second channel; and calculating, by the processor, a third lymphocyte result of the second channel based on the fourth scattergram; and calculating, by the processor, the lymphocyte result of the second channel based on the second lymphocyte result and the third lymphocyte result of the second channel.

7. The sample analysis apparatus of claim 1, wherein the processor is further capable of obtaining a white blood cell count result and/or a basophil result based on the light signal of the second channel.

8. The sample analysis apparatus of claim 7, wherein the basophil result comprises a percentage of basophils in white blood cells.

9. The sample analysis apparatus of claim 7, wherein the processor is further capable of calculating a neutrophil result based on the eosinophil result and the monocyte result of the first channel, the basophil result of the second channel, and a corrected lymphocyte result, and using the neutrophil result as a neutrophil result to be output by the sample analysis apparatus.

10. The sample analysis apparatus of claim 1, wherein the neutrophil result comprises a percentage of neutrophils in white blood cells, the eosinophil result comprises a percentage of eosinophils in the white blood cells, the lymphocyte result comprises a percentage of lymphocytes in the white blood cells, and the monocyte result comprises a percentage of monocytes in the white blood cells.

11. The sample analysis apparatus of claim 1, wherein the first channel is a DIFF channel; and the second channel is a WNB channel.

12. The sample analysis apparatus of claim 1, wherein the light signal of the first channel comprises forward-scattered light, side-scattered light, and fluorescence; and the light signal of the second channel comprises forward-scattered light, side-scattered light, and fluorescence.

13. A sample analysis method, comprising:
preparing a first test sample from a blood sample and a first-channel reagent;
obtaining a light signal generated after the first test sample is irradiated with light;
performing a white blood cell four-part differential based on the light signal of the first test sample, the white blood cell four-part differential comprising a neutrophil result, an eosinophil result, a lymphocyte result, and a monocyte result;
determining whether the lymphocyte result of the first test sample is accurate; and
when it is determined that the lymphocyte result is inaccurate, correcting the lymphocyte result of the first test sample based on a lymphocyte result of a second test sample, wherein the second test sample is prepared from the blood sample and a second-channel reagent, and a light signal generated after the second test sample is irradiated with light is usable to calculate a nucleated red blood cell result and a lymphocyte result.

14. The sample analysis method of claim 13, wherein correcting the lymphocyte result of the first test sample based on a lymphocyte result of a second test sample comprises any one of the following:
using a lymphocyte result of the second channel as a lymphocyte result to be output; or
calculating a weighted sum of the lymphocyte result of the first channel and the lymphocyte result of the second channel as the lymphocyte result to be output.

15. The sample analysis method of claim 13, wherein calculating a lymphocyte result based on the light signal generated after the second test sample is irradiated with light comprises:
the light signal of the second channel comprising at least forward-scattered light and side-scattered light; generating a second scattergram based on the forward-scattered light and the side-scattered light of the second channel; and calculating the lymphocyte result of the second channel based on the second scattergram;
or
the light signal of the second channel comprising at least side-scattered light and fluorescence; generating a third scattergram based on the side-scattered light and the fluorescence of the second channel; and calculating the lymphocyte result of the second channel based on the third scattergram;
or
the light signal of the second channel comprising at least forward-scattered light and fluorescence; generating a fourth scattergram based on the forward-scattered light and the fluorescence of the second channel; and calculating the lymphocyte result of the second channel based on the fourth scattergram;
or
the light signal of the second channel comprising forward-scattered light, side-scattered light, and fluorescence; generating a second scattergram based on the forward-scattered light and the side-scattered light of the second channel; and calculating a first lymphocyte result of the second channel based on the second scattergram; generating a third scattergram based on the side-scattered light and the fluorescence of the second channel; and calculating, by the processor, a second lymphocyte result of the second channel based on the third scattergram; and calculating the lymphocyte result of the second channel based on the first lymphocyte result and the second lymphocyte result of the second channel;
or
the light signal of the second channel comprising forward-scattered light, side-scattered light, and fluorescence; generating a second scattergram based on the forward-scattered light and the side-scattered light of the second channel; and calculating a first lymphocyte result of the second channel based on the second scattergram; generating a fourth scattergram based on the forward-scattered light and the fluorescence of the second channel; and calculating, by the processor, a third lymphocyte result of the second channel based on the fourth scattergram; and calculating the lymphocyte result of the second channel based on the first lymphocyte result and the third lymphocyte result of the second channel;
or
the light signal of the second channel comprising forward-scattered light, side-scattered light, and fluorescence; generating a third scattergram based on the side-scattered light and the fluorescence of the second channel; and calculating a second lymphocyte result of the second channel based on the third scattergram; generating a fourth scattergram based on the forward-scattered light and the fluorescence of the second channel; and calculating, by the processor, a third lymphocyte result of the second channel based on the fourth scattergram; and calculating the lymphocyte result of the second channel based on the second lymphocyte result and the third lymphocyte result of the second channel.

16. The sample analysis method of claim 13, wherein the light signal generated after the second test sample is irradiated with light is further usable to obtain a white blood cell count result and/or a basophil result.

17. The sample analysis method of claim 16, wherein the basophil result comprises a percentage of basophils in white blood cells.

18. The sample analysis method of claim 16, wherein further comprising: calculating a neutrophil result based on the eosinophil result and the monocyte result of the first channel, the basophil result of the second channel, and a corrected lymphocyte result, and using the neutrophil result as a neutrophil result to be output.

19. The sample analysis method of claim 13, wherein the first channel is a DIFF channel; and the second channel is a WNB channel.

20. The sample analysis method of claim 13, wherein the light signal of the first channel comprises forward-scattered light, side-scattered light, and fluorescence; and the light signal of the second channel comprises forward-scattered light, side-scattered light, and fluorescence.

* * * * *